(12) United States Patent
Jainek

(10) Patent No.: US 11,565,203 B2
(45) Date of Patent: *Jan. 31, 2023

(54) FILTER ELEMENT OF A FILTER FOR LIQUID, DRAIN CLOSURE ELEMENT FOR A DRAIN OPENING IN A FILTER HOUSING, HOUSING PART OF A FILTER HOUSING AND FILTER

(71) Applicant: MANN+HUMMEL GmbH, Ludwigsburg (DE)

(72) Inventor: Herbert Jainek, Heilbronn (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 204 days.

This patent is subject to a terminal disclaimer.

(21) Appl. No.: 16/908,072

(22) Filed: Jun. 22, 2020

(65) Prior Publication Data

US 2020/0384391 A1 Dec. 10, 2020

Related U.S. Application Data

(63) Continuation of application No. PCT/EP2018/083471, filed on Dec. 4, 2018.

(30) Foreign Application Priority Data

Dec. 22, 2017 (DE) .......................... 102017012015.3

(51) Int. Cl.
*B01D 35/16* (2006.01)
*B01D 35/30* (2006.01)
(Continued)

(52) U.S. Cl.
CPC .............. *B01D 35/16* (2013.01); *B01D 29/15* (2013.01); *B01D 35/005* (2013.01); *B01D 35/30* (2013.01);
(Continued)

(58) Field of Classification Search
CPC ...... B01D 35/16; B01D 29/15; B01D 35/005; B01D 35/30; B01D 2201/291;
(Continued)

(56) References Cited

U.S. PATENT DOCUMENTS 3,322,280 A 5/1967 Taylor
6,770,110 B1 8/2004 Seifert et al.
(Continued)

FOREIGN PATENT DOCUMENTS

DE 102012209242 A1 12/2013
DE 102016005356 A1 11/2017
(Continued)

*Primary Examiner* — Madeline Gonzalez

(57) ABSTRACT

A filter element of a filter for liquid, a drainage closure element, a housing part, and a filter are described, wherein the filter element has a filter medium which continuously surrounds circumferentially an element interior relative to a virtual axis and is connected to an axial end body. The end body is provided with a filter element drainage opening surrounding the axis and communicating with the element interior. A filter element sealing surface or filter element seal surface of a filter element sealing device is provided at the end body and continuously surrounds circumferentially the filter element drainage opening. The filter element drainage opening is closed by the filter element sealing device when the filter element is mounted in the filter housing of the filter. The filter element sealing surface or filter element seal surface is axially oriented with at least one direction component relative to the axis.

4 Claims, 5 Drawing Sheets

(51) Int. Cl.
  *B01D 35/00*   (2006.01)
  *B01D 29/15*   (2006.01)
  *F02M 37/42*   (2019.01)
  *F01M 11/03*   (2006.01)
  *F01M 11/04*   (2006.01)
  *F01N 3/20*   (2006.01)
  *F16N 39/06*   (2006.01)

(52) U.S. Cl.
  CPC .. *B01D 2201/291* (2013.01); *B01D 2201/342* (2013.01); *B01D 2201/347* (2013.01); *F01M 11/03* (2013.01); *F01M 11/04* (2013.01); *F01M 2011/031* (2013.01); *F01N 3/2066* (2013.01); *F01N 2610/1426* (2013.01); *F02M 37/42* (2019.01); *F16N 39/06* (2013.01)

(58) Field of Classification Search
  CPC ........ B01D 2201/342; B01D 2201/347; B01D 2201/305; B01D 29/21; F01M 11/03; F01M 11/04; F01M 2011/031; F01N 3/2066; F01N 2610/1426; F02M 37/42; F02M 37/32; F02M 37/48; F16N 39/06
  USPC .............................. 210/450, 493.2, 455, 248
  See application file for complete search history.

(56) References Cited

U.S. PATENT DOCUMENTS

| | | |
|---|---|---|
| 2011/0005996 A1 | 1/2011 | Jainek |
| 2015/0014239 A1* | 1/2015 | Jokschas .............. B01D 35/005 210/450 |
| 2018/0328244 A1 | 11/2018 | Ardes |

FOREIGN PATENT DOCUMENTS

| | | |
|---|---|---|
| JP | H09173716 A | 7/1997 |
| JP | H11104409 A | 4/1999 |
| WO | 2014082762 A1 | 6/2014 |

* cited by examiner

FILTER ELEMENT OF A FILTER FOR LIQUID, DRAIN CLOSURE ELEMENT FOR A DRAIN OPENING IN A FILTER HOUSING, HOUSING PART OF A FILTER HOUSING AND FILTER

CROSS-REFERENCE TO RELATED APPLICATIONS

This application is a continuation application of international application No. PCT/EP2018/083471 having an international filing date of 4 Dec. 2018 and designating the United States, the international application claiming a priority date of 22 Dec. 2017 based on prior filed German patent application No. 10 2017 012 015.3, the entire contents of the aforesaid international application and the aforesaid German patent application being incorporated herein by reference.

TECHNICAL FIELD

The invention concerns a filter element of a filter for liquid, with at least one filter medium which continuously surrounds circumferentially an element interior relative to a virtual axis and which is connected at least at one axial end face with an end body, wherein the end body comprises a filter element drainage opening surrounding the axis and communicating with the element interior, and at least one filter element sealing surface or filter element seal surface of a filter element sealing device which continuously surrounds circumferentially the at least one filter element drainage opening and with which the at least one filter element drainage opening can be closed upon mounting of the filter element in a filter housing of the filter.

Moreover, the invention concerns a drainage closure element for at least one drainage opening of a filter housing of a filter for liquid, with at least one part of a connection that, relative to a virtual axis, is rotatable and/or insertable for connecting the drainage closure element to the filter housing, wherein the drainage closure element comprises at least one closure element sealing surface or closure element seal surface of a filter element sealing device for closing at least one filter element drainage opening of a filter element, wherein the at least one closure element sealing surface or closure element seal surface continuously surrounds circumferentially the axis.

Moreover, the invention concerns a housing part of a filter housing of a filter for liquid, wherein in the filter housing at least one filter element can be arranged that comprises at least one element interior and at least one filter element drainage opening to the element interior, wherein the housing part comprises at least one drainage opening for draining liquid from the filter housing which can be closed and opened again by a drainage closure element by means of a connection that, relative to a virtual axis, is rotatable and/or insertable.

Moreover, the invention concerns a filter for liquid, with at least one filter housing in which a filter element is arranged exchangeably and which comprises at least one drainage opening for draining liquid from the filter which can be closed by at least one drainage closure element.

BACKGROUND OF THE INVENTION

WO 2013/178680 A1 discloses a filter device, in particular for a motor vehicle, with a filter housing, with a housing cover fastened to the filter housing and comprising a housing cover drainage opening, with a filter element connectable or connected to the housing cover which comprises a filter element drainage opening and, in a state mounted in the filter housing, separates in the filter housing a raw side from a clean side, with a closure element that can be connected or is connected to the housing cover and, in a state mounted at the housing cover, closes the housing cover drainage opening as well as the filter element drainage opening. The closure element comprises a radial seal by means of which the closure element seals, in the state mounted at the housing cover, the raw side relative to the clean side in the filter element drainage opening.

SUMMARY OF THE INVENTION

The invention has the object to design a filter element, a drainage closure element, a housing part, and a filter of the aforementioned kind such that the liquid can be drained in a simpler, faster, more efficient, and more reliable way from the element interior of the filter element as well as from the interior of the filter housing surrounding the filter element.

This object is solved according to the invention for the filter element such that the at least one filter element sealing surface or filter element seal surface is oriented axially with at least one direction component relative to the axis.

According to the invention, the filter element sealing device is thus designed such that, relative to the axis, it acts to seal at least in axial direction. In this way, upon assembly of the filter and/or upon introduction of a drainage closure element into a drainage opening for fluid, exerted axial connecting forces relative to the axis can contribute to improving the axial sealing action of the filter element sealing device. In case of an axial sealing action, possible swelling of seals cannot lead to a greater force being required for removing the seal in axial direction, which can be the case for exclusively radially acting seals, for example.

Advantageously, the filter element sealing device can be designed such that it acts to seal exclusively in axial direction. In this case, the filter element sealing surface or filter element seal surface can be designed such that it is exclusively oriented in axial direction.

Advantageously, the filter element sealing device can comprise a filter element sealing surface. A corresponding seal surface of an in particular separate seal can rest seal-tightly at the filter element sealing surface. Alternatively, the filter element sealing device can comprise a filter element seal surface. In this case, the filter element seal surface can be part of a seal or of a sealing section on the part of the filter element. The filter element seal surface can rest seal-tightly at a corresponding sealing surface. This sealing surface can advantageously be arranged on the part of the filter housing and/or of the drainage closure element. In an advantageous embodiment, at the end body an annular seal surrounding the axis with at least one axially acting seal surface can be arranged. In this way, the seal can be pre-mounted at the filter element and can be exchanged together therewith. The seal can be connected fixedly to the end body in this context. Alternatively, the seal can be mounted at the end body, in particular clipped on or pushed on. In this case, the end body can have a corresponding at least axially oriented and acting sealing surface which interacts with a corresponding axially acting seal surface of the seal. Moreover, the seal can be provided at the side which is facing away axially from the first mentioned seal surface with a further at least axially oriented seal surface with which it can interact with a corresponding seal surface on the part of the filter housing and/or of the drainage closure element to seal in axial direction. Alternatively, the seal can be mounted at the filter housing and/or at the drainage closure element.

In a further advantageous embodiment, the annular seal can be sleeve-shaped. In this way, an axial distance between corresponding sealing surfaces, on the one hand, on the part of the filter element and, on the other hand, on the part of the filter housing and/or of the drainage closure element can be bridged with the seal.

In a further advantageous embodiment, the filter element drainage opening can connect a raw side of the filter element with a clean side. Correspondingly, the filter element sealing device can separate the clean side from the raw side.

In a further advantageous embodiment, the filter element sealing device can be elastic relative to the axis at least in axial direction. In this way, by a corresponding elastic deformation an in particular mounting-caused, manufacture-caused, and/or component-caused tolerance can be better compensated. Moreover, a sealing action can be improved.

In a further advantageous embodiment, the at least one end body can be provided, at the outer side which is axially facing away from the element interior relative to the axis, with a plurality of circumferentially distributed positioning sections which are spaced apart from each other and provided with radially outwardly oriented positioning surfaces for positioning an annular seal of the filter element sealing device. With the spaced-apart positioning sections, a better position tolerance can be achieved. The seal can be resting partially in radially inward direction against the positioning sections, without acting there so as to seal in radial direction. In this context, no radially acting forces act on the seal.

Alternatively, positioning sections that are circumferentially distributed relative to the axis and spaced apart relative to each other can be arranged on the part of the filter housing and/or of the drainage closure element for positioning an annular seal.

Advantageously, the positioning sections can be realized at a type of sleeve, in particular in the form of a cylinder, a cone or the like. The radially outer circumferential side of the sleeve can comprise corresponding radial projections, in particular teeth, which realize the individual positioning sections. In this manner, the positioning sections can be realized as one piece together with the sleeve. Moreover, the inner part of the sleeve can form additionally the filter element drainage opening at least partially.

In an alternative embodiment, such positioning surfaces for positioning an annular seal of the filter element sealing device can be arranged at an annular or sleeve-shaped seal and can be embodied therewith as one piece. These positioning surfaces, for example, in the form of radial projections, in particular teeth, avoid a radial seal-tight contact of the seal, for example, in case of positioning sections of the seal which are projecting inwardly in radial direction.

Moreover, the object is solved according to the invention for the drainage closure element in that the at least one closure element sealing surface or seal surface is oriented axially with at least with one direction component relative to the axis.

According to the invention, the filter element sealing device is thus configured such that, relative to the axis, it acts to seal at least axially. In this manner, axial connecting forces relative to the axis which are exerted when assembling the filter and/or when introducing a drainage closure element into a drainage opening for fluid can contribute to improving the axial sealing action of the filter element sealing device.

Advantageously, the filter element sealing device can be designed such that it is acting exclusively in axial direction.

In this case, the closure element or seal surface can be designed such that it is oriented exclusively in axial direction.

Advantageously, the filter element sealing device can comprise a closure element sealing surface. A corresponding seal surface of an in particular separate seal can rest seal-tightly against the closure element sealing surface. Alternatively, the filter element sealing device can comprise a closure element seal surface. In this case, the closure element seal surface can be part of a seal on the part of the drainage closure element. The closure element seal surface can rest seal-tightly against a corresponding sealing surface. This sealing surface can be arranged advantageously on the part of the filter element.

In an advantageous embodiment, at least one centering projection can be arranged relative to the axis radially inside the at least one closure element sealing surface or closure element seal surface and can engage the at least one filter element drainage opening. In this way, the filter element can be centered relative to the axis in regard to the drainage closure element. This centering action can be realized when attaching the drainage closure element to the filter housing or when introducing the filter element into the filter housing.

In a further advantageous embodiment, at least one cover surface, provided for closing at least one drainage opening of the filter housing and surrounding the axis circumferentially and oriented axially, can be arranged radially outside of the at least one closure element sealing surface or closure element seal surface. In this way, the filter element drainage opening and the corresponding drainage opening of the filter housing each can be closed off with separate sections of the drainage closure element. In this way, it can be prevented that unpurified liquid can pass from the raw side to the clean side of the filter upon removal of the drainage closure device.

In a further advantageous embodiment, a portion of a drainage sealing device for sealing the drainage opening of the filter housing can be arranged radially outwardly of the at least one closure element sealing surface or seal surface. With the drainage sealing device, the interior of the filter housing can be sealed relative to the environment. The drainage sealing device can be a radially and/or axially acting seal. The drainage closure element can be provided in this context at a circumferentially extending outer side relative to the axis with a seal or a receptacle, in particular a sealing groove, for a seal. The seal can be advantageously an annular seal, in particular an O-ring seal.

Advantageously, the drainage closure element can comprise at least one part of a rotatable and/or insertable connection. The rotatable and/or insertable connection can be in particular a screw connection or a bayonet closure-type connection. Correspondingly, the drainage closure element can comprise a thread or a part of the bayonet closure connection. The corresponding counterpart of the connection can advantageously be arranged at a housing part, in particular a housing cover, of the filter housing.

Moreover, the object is solved according to the invention for the housing part in that the housing part comprises at least one radially inner drainage opening relative to the axis which can communicate with the filter element drainage opening of the at least one filter element and at least one radially outer drainage opening relative to the axis which can communicate with an interior of the filter housing surrounding the at least one filter element and conducting fluid, wherein the radially inner drainage opening is separated by means of at least one separating section from the at least one radially outer drainage opening.

According to the invention, two different drainage openings are provided, namely the at least one radially inner drainage opening and the at least one radially outer drainage opening, so that upon removal of the corresponding at least one drainage closure element the two different drainage openings each can be opened separate from the other. In this way, it can be prevented that unpurified liquid can pass from the raw side of the filter to the clean side. Through the radially outer drainage opening, the liquid from the element interior can escape through the corresponding fluid element drainage opening. The liquid from the interior which surrounds the filter element can escape separately through the at least one radially outer drainage opening. In this way, the different liquids are not mixed with each other.

With the at least one separating section, the region which is connected with the filter element drainage opening can be separated from the fluid-conducting region surrounding the filter element. In this way, it can be prevented that possibly present dirt from the interior surrounding the filter element can reach the region of the filter element drainage opening and the filter element sealing device arranged thereat.

In an advantageous embodiment, the at least one separating section can be a separating wall that surrounds circumferentially the axis. In this way, a circumferentially continuous separating section can be realized.

Advantageously, at least one separating section can be arranged at the filter housing, in particular at a housing part and/or at a drainage closure element. Alternatively or additionally, advantageously at least one separating section can be arranged at the filter element.

Advantageously, at least one separating section can be embodied at the radially inner circumferential side in a corrugated or toothed fashion. Inwardly in radial direction, a plurality of circumferentially spaced apart positioning sections for an annular seal can be arranged. The positioning sections can extend respectively parallel or at a slant to an axis of the at least one separating section. In this way, fluid channels are formed between the positioning sections.

In a further advantageous embodiment, a plurality of radially outer outlet openings can be distributed within an end face of the housing part surrounding the axis. In this way, a uniform drainage of the liquid through the drainage openings can be achieved.

In a further advantageous embodiment, at least one part of an environmental sealing device can be arranged at the side of the at least one radially outer drainage opening that is facing the environment. By means of the environmental sealing device, the interior of the filter housing and thus also the element interior can be sealed relative to the environment.

Advantageously, at least one sealing surface which relative to the axis is circumferentially continuous can be arranged at the housing part. The sealing surface can advantageously be oriented inwardly in radial direction. In this way, a radially acting seal can engage at the sealing surface.

Advantageously, the housing part can comprise a receptacle which continuously extends circumferentially relative to the axis and is in particular stepped. The receptacle can comprise the at least one radially inner drainage opening, the at least one radially outer drainage opening, and the at least one separating section. In addition, the receptacle can comprise the at least one part, in particular at least one sealing surface, of the environmental sealing device. Moreover, the receptacle can comprise at least one part of a connection, which is rotatable and/or insertable relative to a virtual axis, provided with at least one drainage closure element.

Finally, the object is solved according to the invention for the filter in that the latter comprises at least one filter element according to the invention, at least one housing part according to the invention, and at least one drainage closure element according to the invention.

The filter, the filter element, the filter housing, the drainage closure element, and the housing part are provided for purifying liquid. Advantageously, the filter and the filter element can be provided for purifying oil, fuel, urea water solution, water or another liquid. Advantageously, the filter and the filter element can be provided for purifying liquid of an internal combustion engine or another machine or a fuel cell or the like. Advantageously, the filter in the filter element can be provided for purifying liquid of a motor vehicle.

Furthermore, the features and advantages which have been discussed in connection with the filter element according to the invention, the drainage closure element according to the invention, the housing part according to the invention, and the filter according to the invention and their respective advantageous embodiments apply inter alia and vice versa. The individual features and advantages can of course be combined with each other wherein further advantageous effects may result which surpass the sum of the individual effects.

BRIEF DESCRIPTION OF THE DRAWINGS

Further advantages, features, and details of the invention result from the following description in which an embodiment of the invention will be explained in more detail with the aid of the drawing. A person of skill in the art will consider the features disclosed in the drawing, the description, and the claims in combination also expediently individually and combine them to expedient further combinations.

Same components are provided with same reference characters in the Figures.

DESCRIPTION OF PREFERRED EMBODIMENTS

Figure 1:
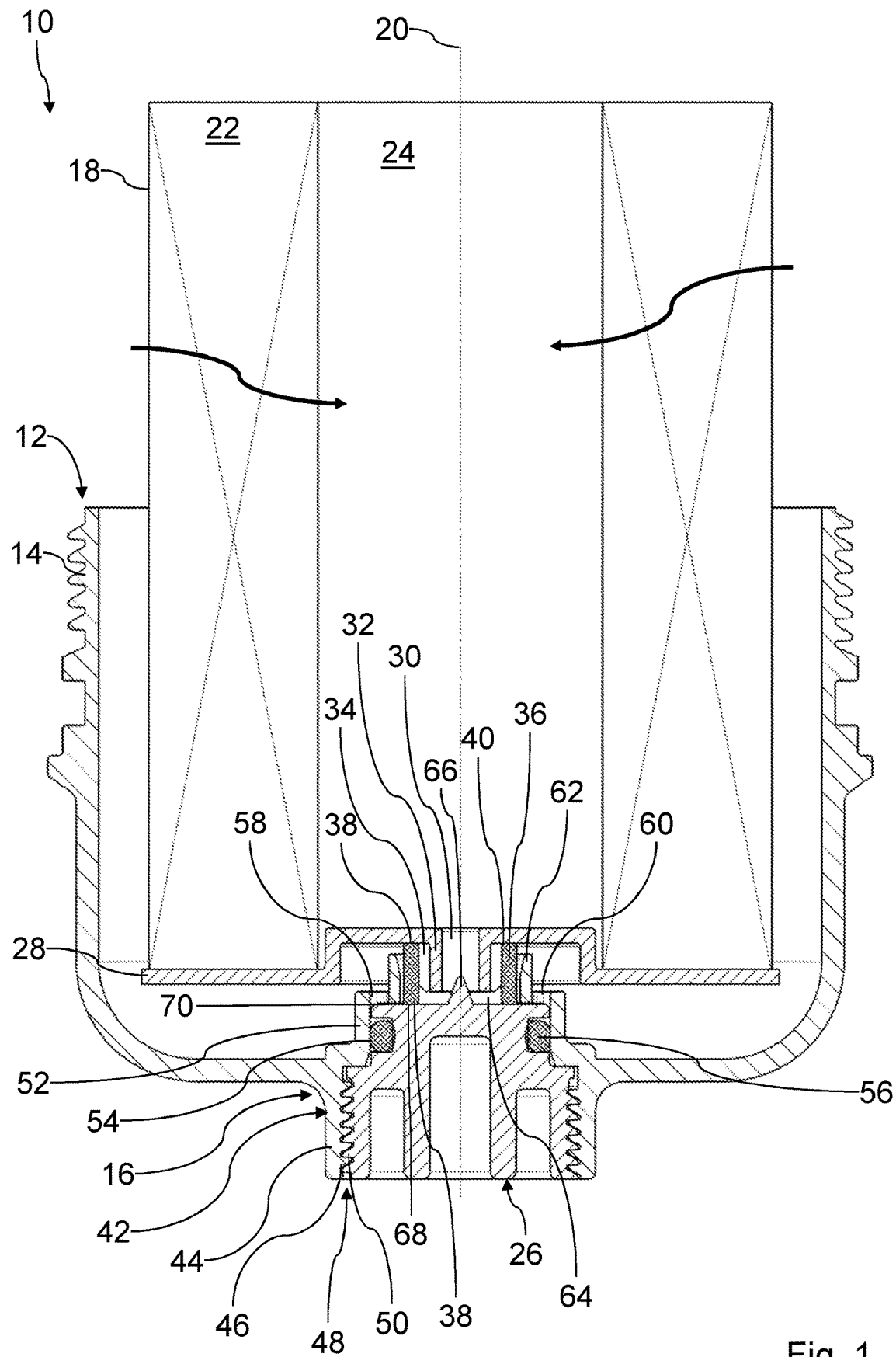
FIG. 1 shows a longitudinal section of a filter for liquid according to a first embodiment.
Figure 2:
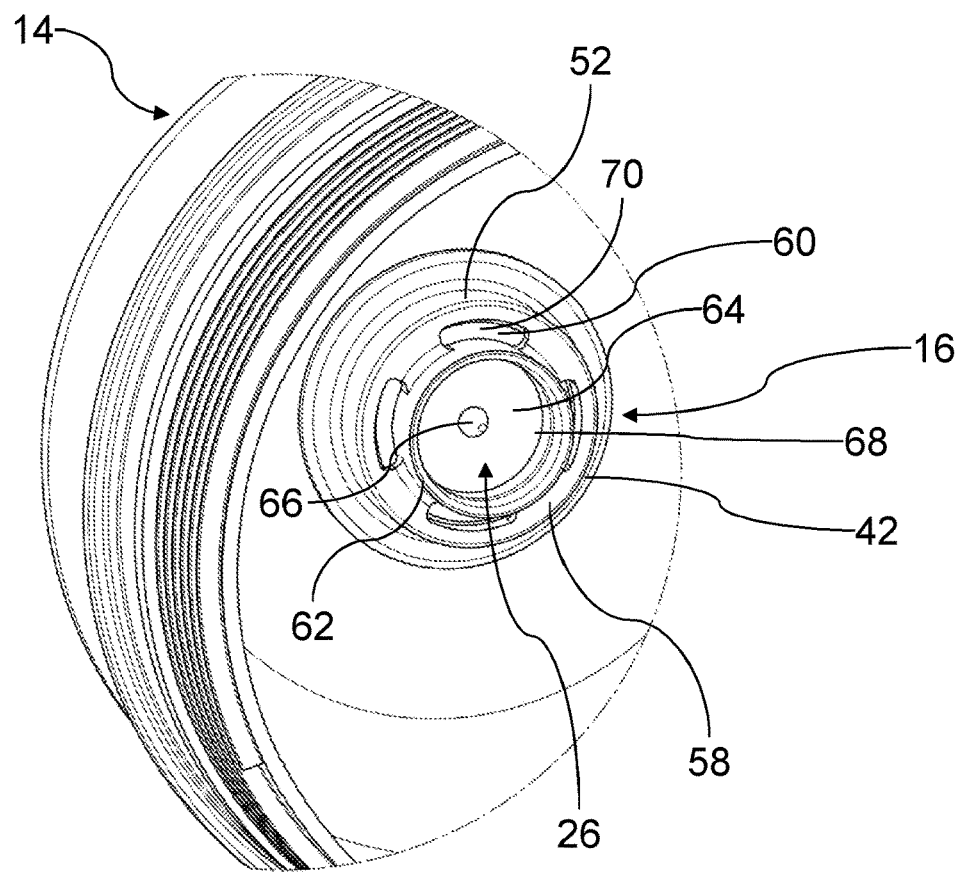
FIG. 2 shows an isometric detail view of a housing cover of the filter of FIG. 1 in the region of a drainage opening for the liquid.
Figure 3:
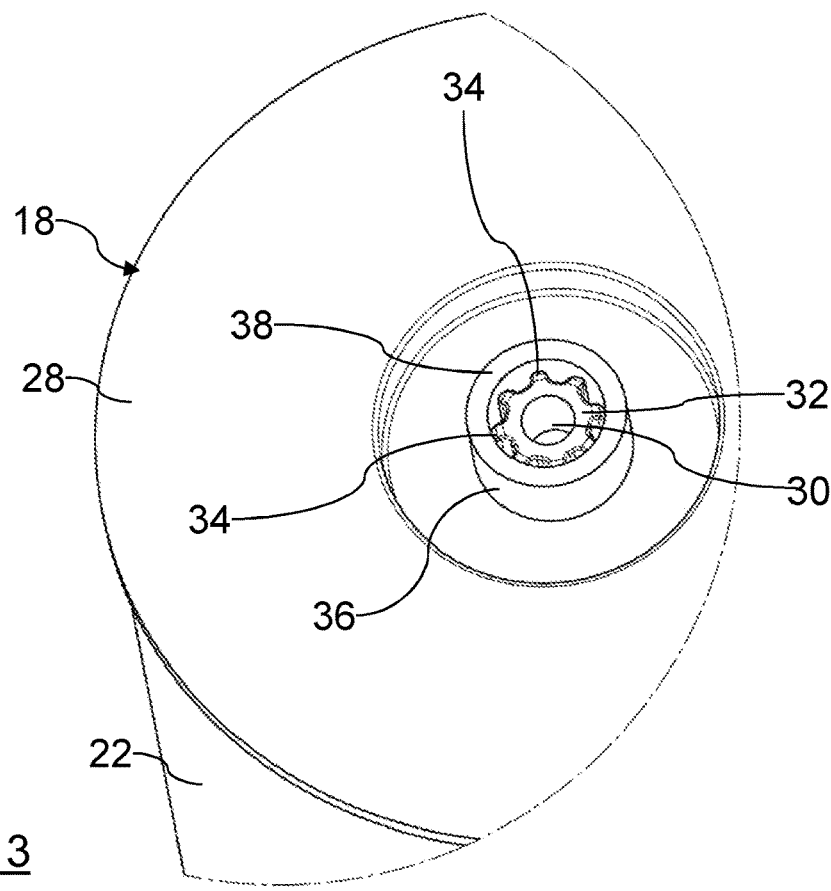
FIG. 3 shows an isometric detail view of a filter element of the filter of FIG. 1 in the region of a filter element drainage opening for the liquid.

In FIGS. 1 to 3, a filter 10 for liquid is illustrated in a longitudinal section and in detail views. For example, the filter 10 can be arranged in a liquid circuit, for example, in a motor oil circuit or in a fuel circuit, for example, of an internal combustion engine, for example, of a motor vehicle.

The filter 10 comprises a filter housing 12 of which in FIG. 1 only the housing cover 14 is illustrated. The housing cover 14 is screwed, spatially at the bottom, into a main housing, not illustrated, of the filter housing 12. The filter housing 12 comprises a liquid inlet for the liquid to be purified and a liquid outlet for purified liquid, which are both not shown in FIG. 1.

Moreover, the filter housing 12 comprises at the spatially lowest position of the housing cover 14 a drainage assembly 16 through which the liquid can be drained from the interior of the filter housing 12, for example, for servicing purposes. In the filter housing 12, a filter element 18 embodied as a round filter element is arranged such that it separates the liquid inlet from the liquid outlet. The filter element 18 is attached to the housing cover 14 so as to be separable in a way not of interest in this context.

The filter element 18 comprises a filter medium 22 which, relative to a virtual axis 20, continuously extends circumferentially and surrounds an element interior 24. When operating the filter 10, the filter element 18 is flowed through by the liquid from the exterior to the interior in radial direction so that the element interior 24 is the clean side of the filter element 18 and the interior of the filter housing 12 surrounding the filter element 18 is the raw side.

When in the following "axial", "radial", "coaxial", "circumferential" or the like is mentioned, this relates to the axis 20, if nothing else is mentioned. In the illustrated embodiment, the axis 20 coincides with an element axis of the filter element 18, an installation axis of the filter element 18 into the housing cover 14, a housing axis of the filter housing 12, and a connecting axis of a drainage closure element 26 of the drainage assembly 16 with the housing cover 14. For simplifying matters, in the following reference is therefore being had to the axis 20, respectively. It is understood that the axis 20 corresponds to the respectively aforementioned axes when the filter 10 is demounted.

At an end face of the filter element 18, in FIG. 1 at the bottom and facing the drainage assembly 16, an end disc 28 is attached. The end disc 28 extends across the entire end face of the filter element 18. In the region of the element interior 24 the end disc 28 is axially stepped toward the element interior 24. The end disc 28 is provided there with a coaxial filter element drainage opening 30.

At the outer side of the end disc 28 facing away axially from the element interior 24, the filter element drainage opening 30 is provided inside a positioning element 32.

The positioning element 32 has the shape of a sleeve which has a circular cylinder shape at its radial inner circumferential side. At the radial outer circumferential side the positioning element 32 is toothed and forms thus in radial direction outwardly a plurality of circumferentially spaced-apart positioning sections 34 for a filter element seal 36. The positioning sections 34 extends respectively parallel to the axis 20.

The filter element seal 36 is embodied as a sleeve in the form of a circular hollow cylinder which is coaxially arranged. With its radial inner circumferential side, the filter element seal 36 is resting, with circumferential interruptions, at the respective positioning sections 34 so as not to seal radially and is thereby positioned.

At it's axially oppositely positioned end faces, the filter element seal 36 has a filter element seal surface 38, respectively. The filter element seal surfaces 38 each are exclusively axially oriented. The filter element seal 36 comprises therefore no sealing surface acting in radial direction.

The filter element seal 36 projects past the positioning element 32 in axial direction. The filter element seal 36 is made of an elastomer and elastic at least an axial direction.

With its filter element seal surface 38 facing axially the element interior 24, the filter element seal 36 is resting so as to act seal-tightly in axial direction at a filter element sealing surface 40. The filter element sealing surface 40 continuously surrounds circumferentially the positioning element 32 in radial direction outwardly at the outer side of the end disc 28 that is axially facing away from the element interior 24. The filter element sealing surface 40 is oriented also exclusively in axial direction.

The drainage assembly 16 comprises the drainage closure element 26 and a receptacle 42 for the drainage closure element 26 which is arranged at the spatially lower part of the housing cover 14. The receptacle 42 is embodied as a whole as one piece together with the housing cover 14.

The receptacle 42 comprises a coaxial connecting section 44 in the form of a circular cylindrical sleeve at the outer side of the housing cover 14. At its radial inner circumferential side, the connecting section 44 comprises an inner thread 46 of a screw connection 48 which interacts with a corresponding outer thread 50 at the radially outer circumferential side of the drainage closure element 26.

At the inner side of the housing cover 14 which is facing axially the filter element 18, the receptacle 42 comprises a coaxial sealing section 52 in the form of a hollow circular cylinder. The sealing section 52 forms at its radially inner circumferential side a circumferential sealing surface 54 which is oriented inwardly in radial direction. At the environmental sealing surface 54 an environmental sealing ring 56 is resting so as to act sealingly in radial direction. The environmental sealing ring 56 is arranged in a sealing groove in the radially outer circumferential side of the drainage closure element 26.

At the side which is facing away from the bottom of the housing cover 14 in axial direction, the sealing section 52 is bent by 90° radially inwardly and forms there an end wall 58. In the end wall 58, a plurality of radially outer drainage openings 60 are arranged and circumferentially distributed.

Radially inwardly of the radially outer drainage openings 60, the end wall 58 is bent by 90° away from the bottom of the housing cover 14 and passes into a separating section 62. The separating section 62 has the shape of a coaxial hollow circular cylinder. The separating section 62 forms thus a circumferentially continuous separating wall. The separating section 62 surrounds a coaxial radially inner drainage opening 64. The separating section 62 separates in this way the radially outer drainage opening 60 from the radially inner drainage opening 64.

In the region of its rim facing axially away from the end wall 58, the separating section 62 is widened in a funnel shape at the radially inner circumferential side. An axial expansion of the separating section 62 is smaller than an axial expansion of the filter element seal 36 in the relaxed state. Upon axial compression of the filter element seal 36, the separating section 62 can serve as a stop. An inner diameter of the separating section 62 is larger than an outer diameter of the filter element seal 36. With mounted filter element 18, the separating section 62 surrounds the filter element seal 36 without contacting it. In this way, no radial sealing action between the separating section 62 and the filter element seal 36 is taking place.

The end face of the drainage closure element 26 which is axially facing the interior of the filter housing 12 extends flat and perpendicular to the axis 20. At its center, the end face comprises a conical coaxial centering element 66. The maximum outer diameter of the centering element 66 is smaller than the inner diameter of the filter element drainage opening 30. The centering element 66 can thus engage the filter element drainage opening 30 in order to center the filter element 18 accordingly.

Radially outwardly of the centering element 66, the end face of the drainage closure element 26 forms a circumferentially continuous sealing surface 68. The sealing surface 68 corresponds in its diameter and its radial expansion to the corresponding facing, spatially lower filter element seal surface 38 of the filter element seal 36. The sealing surface 68 is oriented exclusively in axial direction. When the filter 10 is mounted, the filter element seal surface 38 of the filter element seal 36 is resting at the seal surface 68 so as to exclusively act sealingly in axial direction.

Radially outwardly of the sealing surface 68, the end face of the drainage closure element 26 forms an annular cover surface 70 with which the radially outer drainage openings 60 are covered and closed when the filter 10 is mounted.

A radially outer diameter of the end face of the drainage closure element 26 corresponds to a radially inner diameter of the seal section 52 of the receptacle 42.

By means of the filter element seal 36, the clean side of the filter element 18 is separated from the raw side. The separating section 62 in combination with the labyrinth-type arrangement of the recess of the end disc 28 prevent that coarse dirt, for example, chips, can pass from the raw side into the region of the filter element seal 36 and impair its sealing action.

For draining the liquid from the filter 10, for example, for servicing purposes, the drainage closure element 26 is moved out of the receptacle 42, for example, unscrewed. In doing so, the filter element seal 36 at the side which is facing the sealing surface 68 opens the connection between the filter element drainage opening 30 and the radially inner drainage opening 64 so that liquid can drain from the clean side.

Also, the cover surface 70 releases the radially outer drainage openings 60 so that the liquid from the raw side can drain through the radial outer drainage openings 60.

For exchange of the filter element 18, the housing cover 14 is unscrewed from the housing base body. Subsequently, the filter element 18 together with the filter element seal 36 can be pulled out of the housing cover 14 in axial direction and exchanged.

The assembly of the filter 10 is done in reverse order.

Figure 4:
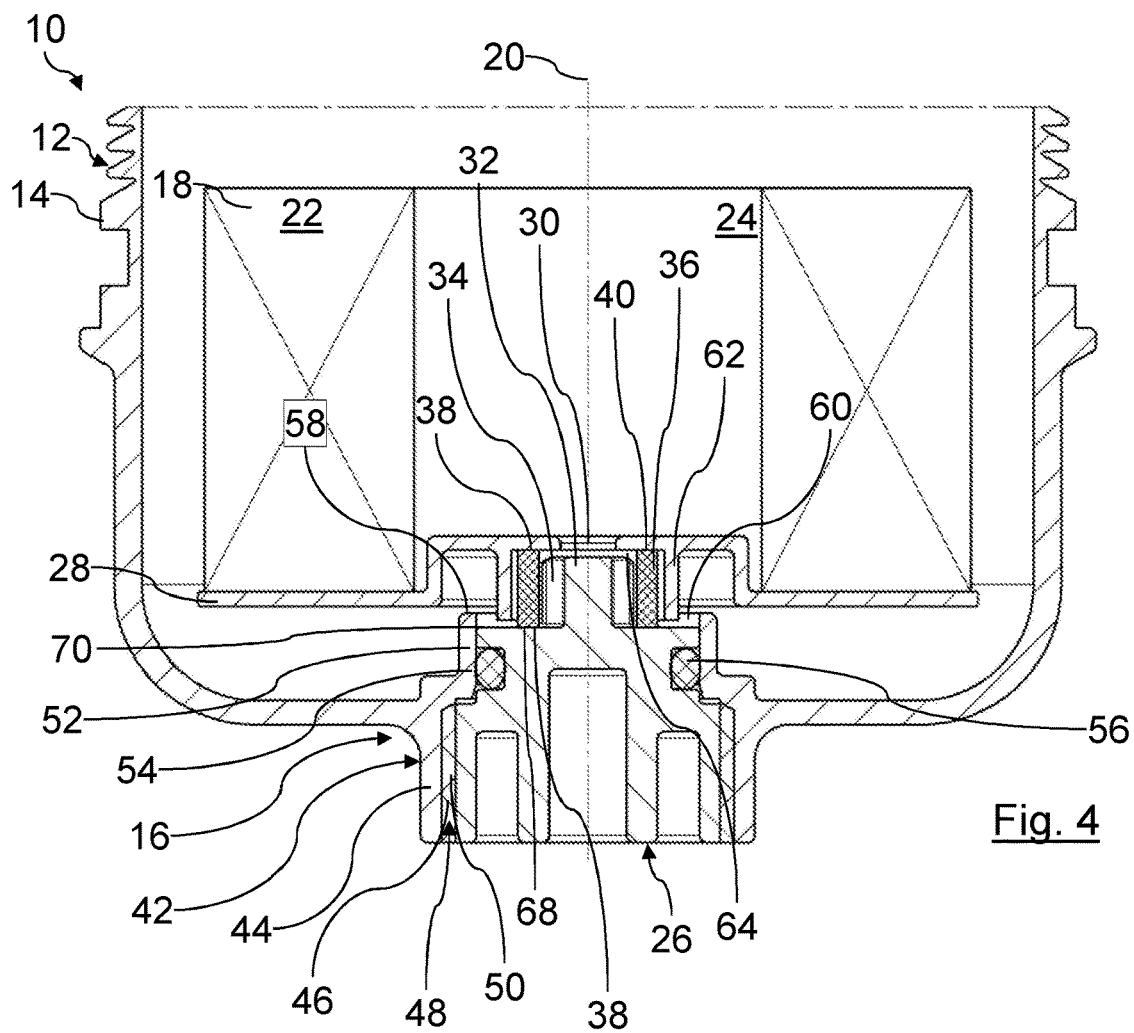
FIG. 4 shows a longitudinal section of a filter for liquid according to a second embodiment.
Figure 5:
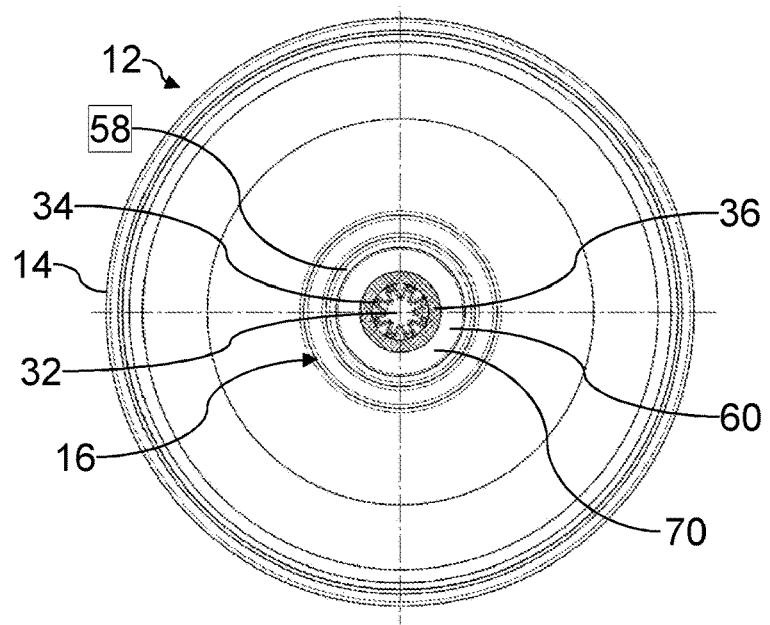
FIG. 5 shows an interior of the filter housing of the filter of FIG. 4 without filter element.

FIGS. 4 and 5 show a second embodiment of a filter 10. Those elements which are similar to those of the first embodiment of FIGS. 1 to 3 are provided with the same reference characters. The second embodiment differs from the first embodiment in that the positioning element 32 is fastened at the drainage closure element 26 associated with the housing instead of at the filter element 18. The positioning element 32 is realized in an exemplary fashion as one piece together with the drainage closure element 26. A centering element as it has been realized in the first embodiment on the part of the drainage closure element 26 with reference character 66 is not used in the second embodiment. The filter element seal 36 is detachably pushed onto the positioning element 32 associated with the housing.

Moreover, in the second embodiment the separating section 62 is fastened at the filter element 18 instead of at the receptacle 42 at the housing. The separating section 62 is realized in an exemplary fashion as one piece together with the end disc 28.

Figure 6:
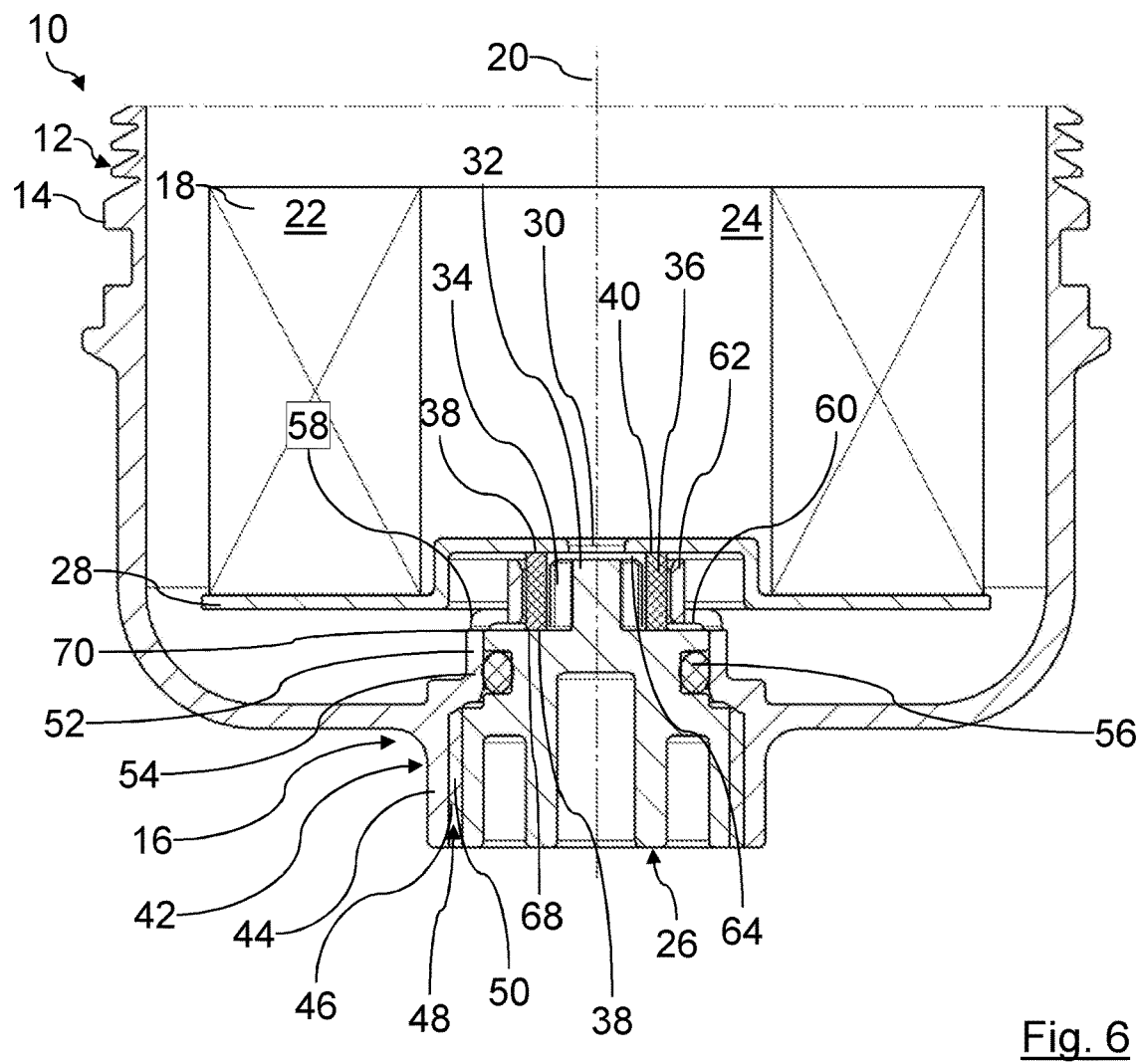
FIG. 6 shows a longitudinal section of a filter for liquid according to a third embodiment.
Figure 7:
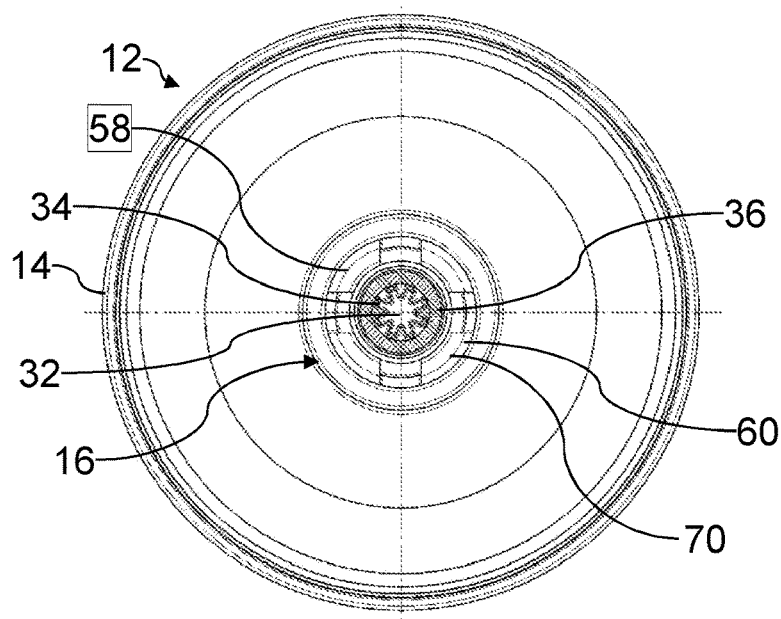
FIG. 7 shows the interior of the filter housing of the filter of FIG. 6 without filter element.

In FIGS. 6 and 7, a third embodiment of the filter 10 is illustrated. Those elements that are similar to those of the first embodiment of FIGS. 1 to 3 are provided with the same reference characters. The third embodiment differs from the first embodiment in that the positioning element 32 is fastened to the drainage closure element 26 associated with the housing instead of at the filter element 18. The positioning element 32 in an exemplary fashion is realized as one piece together with the drainage closure element 26. A centering element as it has been realized in the first embodiment on the part of the closure element 26 with reference characters 66 is not used in the third embodiment. The filter element seal 36 is detachably pushed onto the positioning element 32 associated with the housing.

Figure 8:
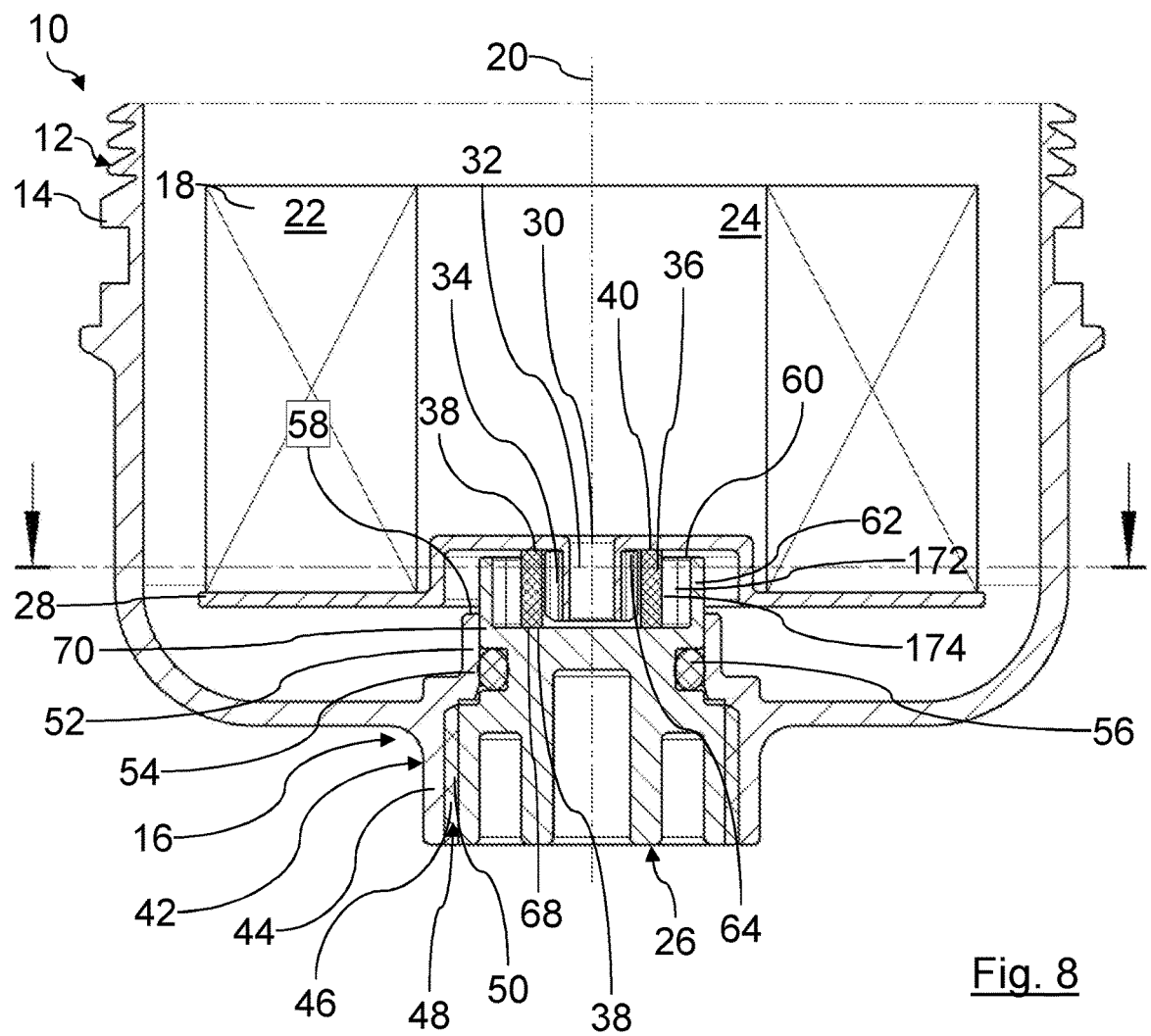
FIG. 8 shows a longitudinal section of a filter for liquid according to a fourth embodiment.
Figure 9:
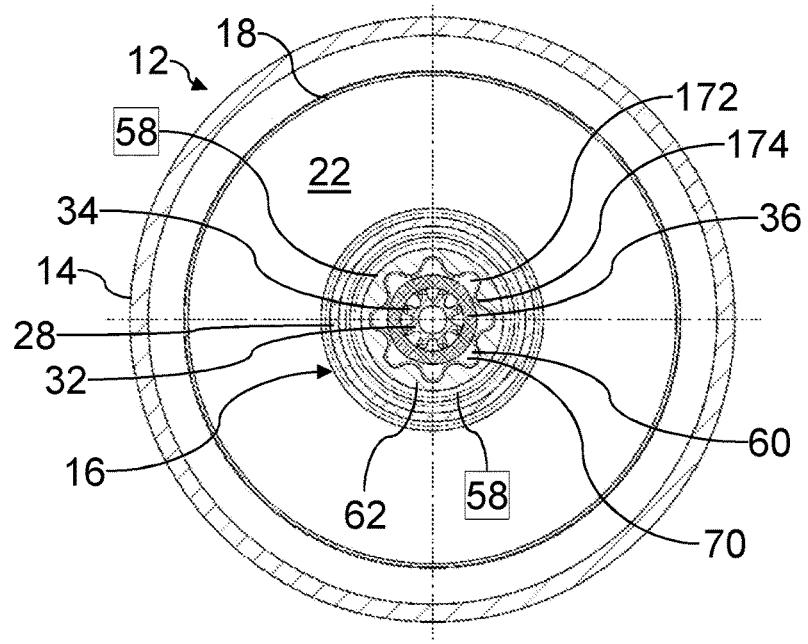
FIG. 9 shows a cross section of the filter of FIG. 8 along the section line IX-IX therein.

In FIGS. 8 and 9, a fourth embodiment of a filter 10 is illustrated. Those elements that are similar to those of the first embodiment of FIGS. 1 to 3 are provided with the same reference characters. The fourth embodiment differs from the first embodiment in that the separating section 62 is fastened at the drainage closure element 26 associated with the housing instead of at the receptacle 42. The separating section 62 is realized in an exemplary fashion as one piece together with the drainage closure element 26. Moreover, the radially inner circumferential side of the separating section 62 in cross section is provided with a corrugated profile 172. The radially inwardly positioned regions form a plurality of positioning sections 174. The positioning sections 174 serve as guide and contact of the radially outer circumferential side of the filter element seal 36. The regions between the positioning sections 174 extend in an exemplary fashion parallel to the axis 20. They form channels through which upon removal of the filter element 18 and release of the drainage assembly 16 the liquid contained in the element interior 24 can drain to the exterior into the housing cover 14. A separate centering element as has been realized in the first embodiment on the part of the drainage closure element 26 with reference character 66 is not used in the fourth embodiment.

What is claimed is:

1. A filter element of a filter for liquid, the filter element comprising:
   at least one filter medium continuously surrounding circumferentially an element interior relative to a virtual axis of the filter element;
   an end body connected to an axial end face of the at least one filter medium;
   wherein the end body comprises a filter element sealing device comprising:
      a seal positioning element formed on an axially outer side of the end body and projecting outwardly away from the element interior, the seal positioning element comprising:
         a plurality of radially outwardly projecting seal positioning sections circumferentially spaced apart about an outer circumference of the seal positioning element;
         wherein the plurality of radially outwardly projecting seal positioning sections have radially outward-facing positioning surfaces for positioning a ring-shaped seal;
         a filter element drainage opening extending axially through an interior seal positioning element, surrounding the virtual axis and communicating with the element interior;
      wherein the filter element drainage opening surrounds the virtual axis;

the ring-shaped seal having a radially inner surface resting with interruptions on the radially outward-facing positioning surfaces, the ring-shaped seal further comprising:
at least one ring-shaped filter element sealing surface arranged on an axially outer face of the ring-shaped seal and continuously surrounding circumferentially the filter element drainage opening;
wherein the seal positioning element with the ring-shaped seal of the filter element sealing device are configured to close the filter element drainage opening when the filter element is mounted in a filter housing of the filter.

2. The filter element according to claim 1, wherein the annular ring-shaped seal is a sleeve.

3. The filter element according to claim 1, wherein the filter element drainage opening connects a raw side of the filter element to a clean side of the filter element.

4. The filter element according to claim 1, wherein
the filter element sealing device is configured to be elastic at least in an axial direction relative to the virtual axis.

* * * * *